US011508400B2

(12) United States Patent
Matsumoto

(10) Patent No.: US 11,508,400 B2
(45) Date of Patent: Nov. 22, 2022

(54) MAGNETIC DISK DEVICE WITH RECORDING HEAD INCLUDING SPIN TORQUE OSCILLATOR

(71) Applicants: KABUSHIKI KAISHA TOSHIBA, Minato-ku (JP); TOSHIBA ELECTRONIC DEVICES & STORAGE CORPORATION, Tokyo (JP)

(72) Inventor: Takuya Matsumoto, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/405,911

(22) Filed: Aug. 18, 2021

(65) Prior Publication Data

US 2022/0284922 A1    Sep. 8, 2022

(30) Foreign Application Priority Data

Mar. 8, 2021    (JP) .............................. JP2021-036362

(51) Int. Cl.

| | | |
|---|---|---|
| *G11B 5/31* | (2006.01) | |
| *G11B 5/127* | (2006.01) | |
| *H01F 10/32* | (2006.01) | |
| *G11B 5/39* | (2006.01) | |
| *G11B 5/00* | (2006.01) | |

(52) U.S. Cl.
CPC ............ *G11B 5/1278* (2013.01); *G11B 5/313* (2013.01); *G11B 5/3109* (2013.01); *G11B 5/3143* (2013.01); *G11B 5/3146* (2013.01); *G11B 5/3153* (2013.01); *G11B 5/3903* (2013.01); *H01F 10/329* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,953,273 B1 * | 2/2015 | Funayama | ............. G11B 5/012 360/68 |
| 9,007,723 B1 | 4/2015 | Igarashi et al. | |
| | | (Continued) | |

FOREIGN PATENT DOCUMENTS

JP          4358279 B2     11/2009

*Primary Examiner* — Jefferson A Evans
(74) *Attorney, Agent, or Firm* — Allen & Overy LLP

(57) ABSTRACT

According to one embodiment, a magnetic disk device includes a recording medium, a recording head including a main magnetic pole, a write shield magnetic pole, a coil, and a spin torque oscillator provided between the main magnetic pole and the write shield magnetic pole and a controller including a record current supply circuit and a drive current supply circuit. The controller executes a process of monitoring variation of a resistance value of the spin torque oscillator while increasing the record current in a state in which the spin torque oscillator is energized and detecting a record current value when the resistance value is increased most largely, and a process of setting the detected record current value to a lower limit of the record current supplied to the coil.

7 Claims, 10 Drawing Sheets

(56) References Cited

U.S. PATENT DOCUMENTS

| | | | |
|---|---|---|---|
| 9,099,128 B1 | 8/2015 | Contreras et al. | |
| 9,117,474 B1* | 8/2015 | Contreras | G11B 5/6005 |
| 9,275,672 B2 | 3/2016 | Shiroishi et al. | |
| 9,672,846 B1* | 6/2017 | Tanaka | G11B 5/17 |
| 9,704,552 B2* | 7/2017 | Kudo | G11C 11/161 |
| 9,799,369 B2* | 10/2017 | Tabata | G11B 5/3153 |
| 10,916,266 B2* | 2/2021 | Tomoda | G11B 5/59688 |
| 11,087,784 B2* | 8/2021 | Contreras | G11B 5/3912 |
| 2009/0052095 A1 | 2/2009 | Yamada et al. | |
| 2013/0083423 A1* | 4/2013 | Shiroishi | G11B 5/3146 360/75 |
| 2013/0335847 A1* | 12/2013 | Shiroishi | G11B 5/607 360/59 |
| 2017/0186450 A1* | 6/2017 | Yamada | G11B 5/17 |
| 2019/0279666 A1* | 9/2019 | Freitag | G11B 5/6082 |
| 2021/0201940 A1* | 7/2021 | Isokawa | G11B 5/02 |
| 2021/0358517 A1* | 11/2021 | Isokawa | G11B 5/3983 |

\* cited by examiner

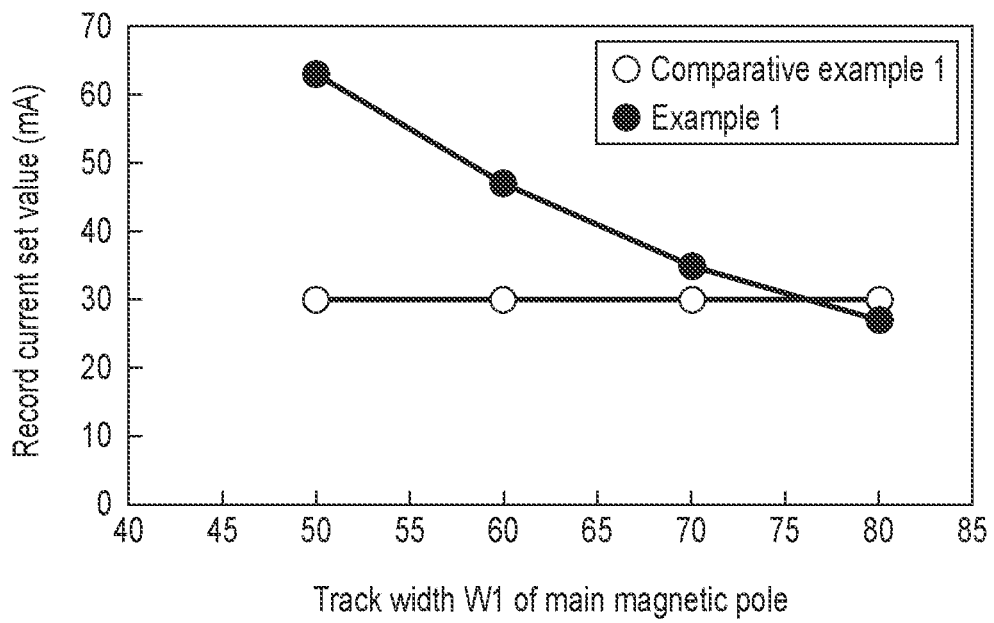
F I G. 8
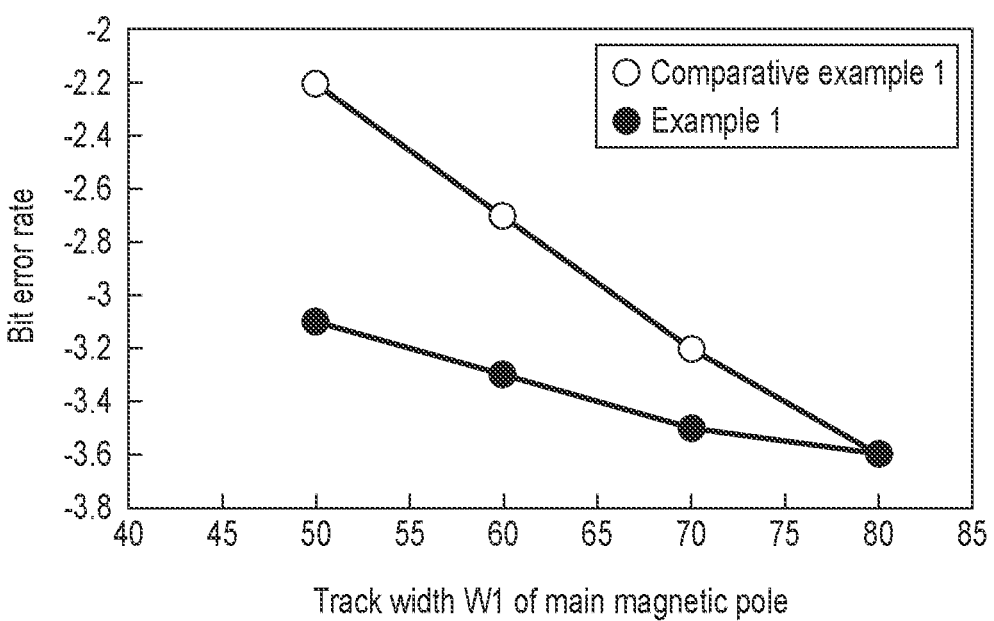
F I G. 9

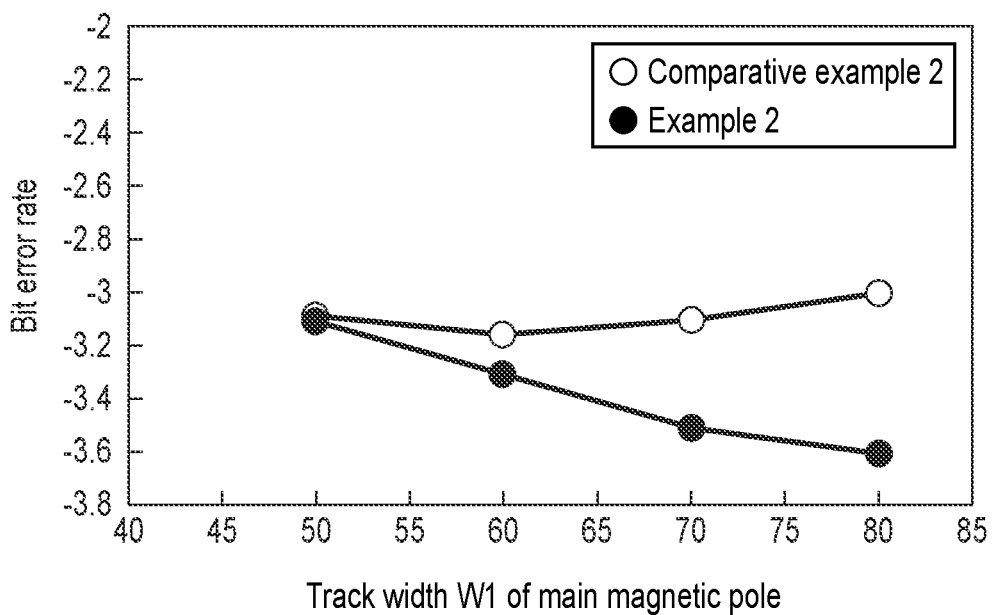
F I G. 12
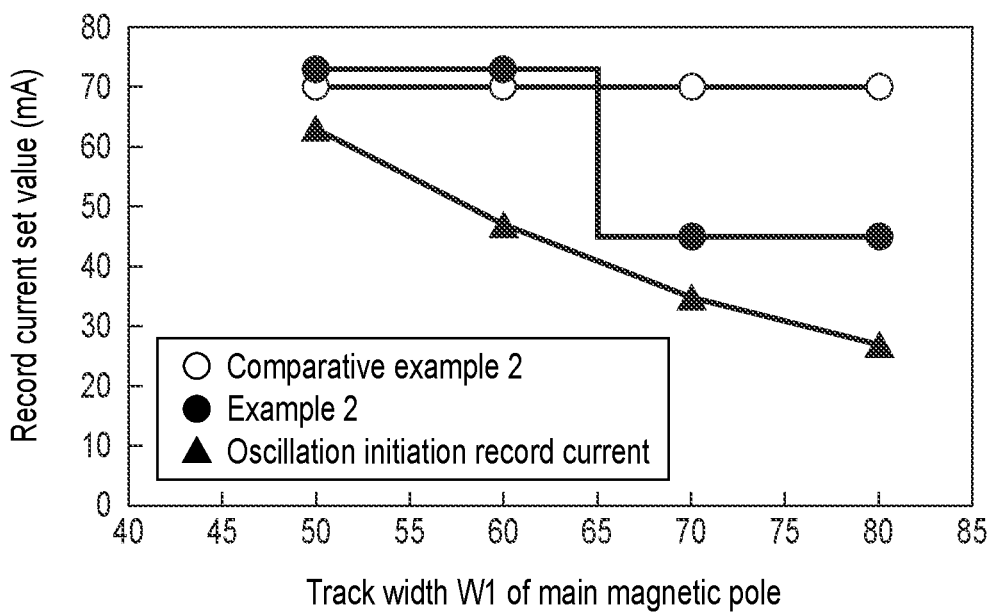
F I G. 13

MAGNETIC DISK DEVICE WITH RECORDING HEAD INCLUDING SPIN TORQUE OSCILLATOR

CROSS-REFERENCE TO RELATED APPLICATIONS

This application is based upon and claims the benefit of priority from Japanese Patent Application No. 2021-036362, filed Mar. 8, 2021, the entire contents of which are incorporated herein by reference.

FIELD

Embodiments described herein relate generally to a magnetic disk device.

BACKGROUND

In recent years, a magnetic head for vertical magnetic recording has been proposed to increase the recording density, to increase capacity, or to achieve downsizing in magnetic disk drives. In such a magnetic head, a recording head includes a main magnetic pole that allows a vertical field to be generated, a write shield magnetic pole opposed to the main magnetic pole with a write gap interposed therebetween, and a coil that allows a magnetic flux to flow to the main magnetic pole. In addition, a high frequency assist head in which a high frequency oscillator, for example, a spin torque oscillator is provided in a write gap between a write shield magnetic pole and a main magnetic pole to apply a high frequency magnetic field from the spin torque oscillator has been proposed.

A gap magnetic field (i.e., a magnetic field between a main magnetic pole and a write shield magnetic pole) applied to an oscillator and a spin polarized electron (hereinafter referred to as a spin transfer torque force) generated by energizing the spin torque oscillator are balanced, the magnetization of the oscillator thereby rotates in a natural oscillation cycle, and the oscillation of the spin torque oscillator is thus caused.

In a magnetic head, the shape (for example, the track width of the main magnetic pole) of the distal end of the main magnetic pole is varied in a manufacturing process. Since this variation also affects the magnitude of the gap magnetic field, the oscillation situation of the high frequency oscillator may be varied by a magnetic head.

BRIEF DESCRIPTION OF THE DRAWINGS

FIG. 8 is a graph showing a relationship between a record current set value and the track width of the main magnetic pole.

FIG. 9 is a graph showing a relationship between a bit error rate and the track width of the main magnetic pole.

FIG. 12 is a graph showing a relationship between a bit error rate and the track width of the main magnetic pole in the second embodiment.

FIG. 13 is a graph showing a modified example of the second embodiment in which the record current value is varied in stages.

DETAILED DESCRIPTION

Figure 1:
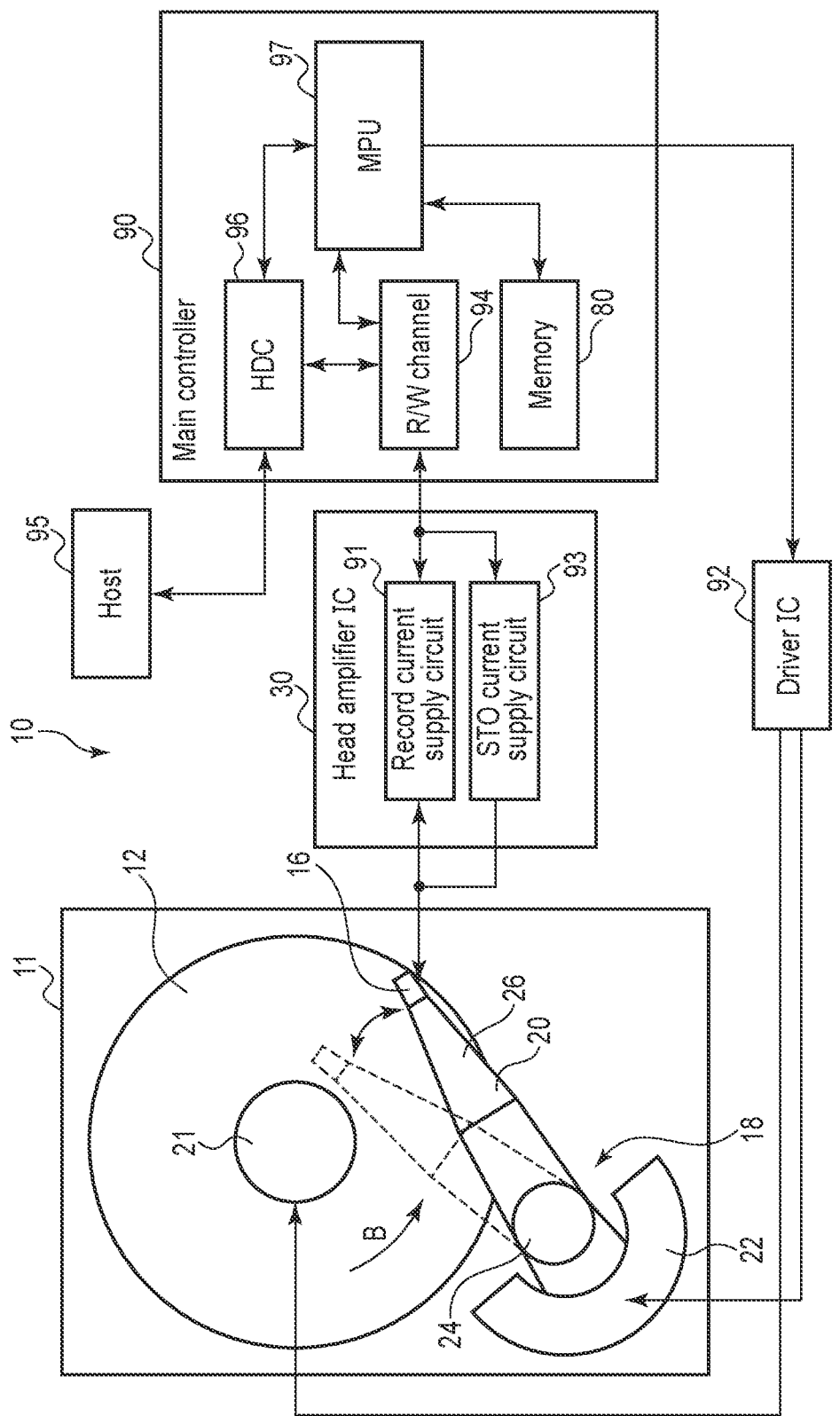
FIG. 1 is a block diagram schematically showing a hard disk drive (HDD) according to a first embodiment.

Various embodiments will be described hereinafter with reference to the accompanying drawings.

In general, according to one embodiment, a magnetic disk device comprises: a disk-shaped recording medium including a magnetic recording layer; a recording head comprising a main magnetic pole generating a recording magnetic field to the magnetic recording layer, a write shield magnetic pole opposed to the main magnetic pole with a write gap to configure a magnetic core together with the main magnetic pole, a coil exciting a magnetic flux at the magnetic core, and a spin torque oscillator provided between the main magnetic pole and the write shield magnetic pole inside the write gap; and a controller comprising a record current supply circuit applying a record current to the coil and a drive current supply circuit supplying a drive current to the spin torque oscillator. The controller is configured to execute a process of monitoring variation of a resistance value of the spin torque oscillator while increasing the record current in a state in which the spin torque oscillator is energized, and executing and detecting a record current value when the resistance value is increased most largely, and a process of setting the detected record current value to a lower limit of the record current supplied to the coil.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection

First Embodiment

Figure 2:
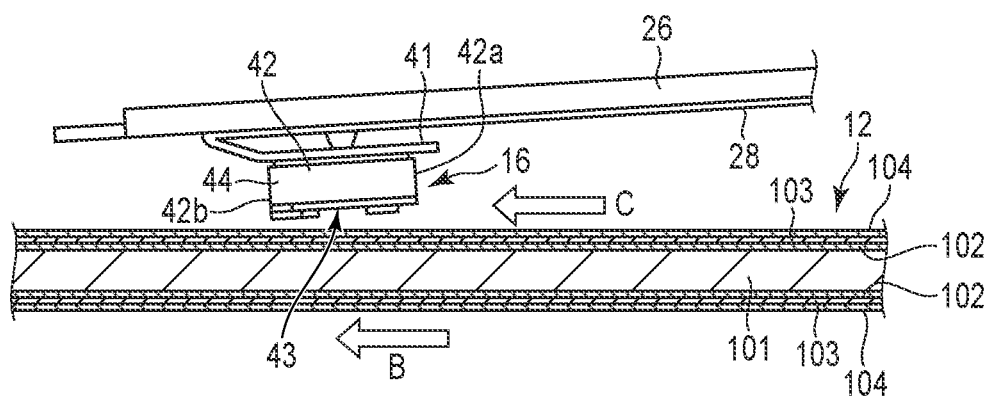
FIG. 2 is a side view showing a magnetic head, a suspension, and a magnetic disk in the HDD.

A hard disk drive (HDD) according to a first embodiment will be described in detail as a magnetic disk device. FIG. 1 is a block diagram schematically showing the HDD according to the first embodiment, and FIG. 2 is a side view showing a magnetic head in a floating state and a magnetic disk.

As shown in FIG. 1, an HDD 10 comprises a rectangular housing 11, a magnetic disk 12 serving as a recording medium arranged in the housing 11, a spindle motor 21 supporting and rotating the magnetic disk 12, and a plurality of magnetic heads 16 writing data to and reading data from the magnetic disk 12. The HDD 10 comprises a head actuator 18 which moves the magnetic heads 16 onto an arbitrary track on the magnetic disk 12 and positions the magnetic heads 16. The head actuator 18 comprises a carriage assembly 20 which supports the magnetic heads 16 to be movable, and a voice coil motor (VCM) 22 which rotates the carriage assembly 20. The carriage assembly 20 comprises a bearing 24 rotatably fixed to the housing 11 and a plurality of suspensions 26 extending from the bearing 24.

The HDD 10 comprises a head amplifier IC 30, a main controller 90, and a driver IC 92, which drive the magnetic heads 16. For example, the head amplifier IC 30 is provided in the carriage assembly 20 and is electrically connected to the magnetic heads 16. The head amplifier IC 30 comprises a record current supply circuit (record current supply unit) 91 supplying the record current to record coils of the magnetic heads 16, and an STO drive current supply circuit (STO current supply unit) 93 for supplying a drive current to a spin torque oscillator (STO) to be described below. In the present embodiment, the head amplifier IC 30 and the main controller 90 construct a controller of the HDD 10.

The main controller 90 and the driver IC 92 are configured on, for example, a control circuit board (not shown) provided on the back surface side of the housing 11.

The main controller 90 comprises an R/W channel 94, a hard disk controller (HDC) 96, and a microprocessor (MPU) 97. For example, in the main controller 90, the MPU 97 executes a process of monitoring and operating a resistance value of the spin torque oscillator, and a process of setting a record current value obtained when the resistance value most increases, i.e., a record current value corresponding to an oscillation initiation record current of the spin torque oscillator, as a lower limit of the record current. The set lower limit is stored in a memory 80.

The main controller 90 is electrically connected to the magnetic heads 16 via the head amplifier IC 30. The main controller 90 is electrically connected to the VCM 22 and the spindle motor 21 via the driver IC 92. The HDC 96 is connectable to a host computer 95.

As shown in FIG. 1 and FIG. 2, the magnetic disk 12 is configured as a perpendicular magnetic recording medium. The magnetic disk 12 comprises, for example, a substrate 101 which is formed of a nonmagnetic material in a shape of a disk having a diameter of approximately 2.5 inches (6.35 cm). A soft magnetic layer 102 formed of a material exhibiting a soft magnetic property as an underlayer, a perpendicular magnetic recording layer 103 having magnetic anisotropy in a direction perpendicular to the surface of the magnetic disk 12, and a protective film 104 are stacked in order on each surface of the substrate 101. The magnetic disk 12 is fitted to a hub of the spindle motor 21, coaxially with each other. The magnetic disk 12 is rotated by the spindle motor 21 at a predetermined speed in a direction of an arrow B.

As shown in FIG. 2, the magnetic heads 16 are supported by extending ends of the respective suspensions 26. The magnetic head 16 is electrically connected to the head amplifier IC 30 via a wiring member (flexure) 28 provided on the carriage assembly 20.

The magnetic head 16 is configured as a flying type head, and comprises a slider 42 formed in a substantially rectangular parallelepiped shape and a head unit 44 formed at an end portion on the flow-out end (trailing) side of the slider 42. The slider 42 is formed of, for example, a sintered body (AlTiC) of alumina and titanium carbide and the head unit 44 is formed of a plurality of thin films. The slider 42 is attached to a gimbal portion 41 of the wiring member 28.

The slider 42 has a rectangular disk facing surface (air bearing surface [ABS]) 43 that faces the surface of the magnetic disk 12. The slider 42 is maintained in a state of flying at a predetermined distance from the surface of the magnetic disk 12 because of an airflow C produced between the disk surface and the ABS 43 by the rotation of the magnetic disk 12. The direction of the airflow C coincides with the direction of rotation B of the magnetic disk 12. The slider 42 comprises a leading end 42a located on the flow-in side of the airflow C, and a trailing end 42b located on the flow-out side of the airflow C. In accordance with the rotation of magnetic disk 12, the magnetic head 16 runs in a direction (head running direction) opposite to the direction of rotation B of the magnetic disk, for the magnetic disc 12.

Figure 3:
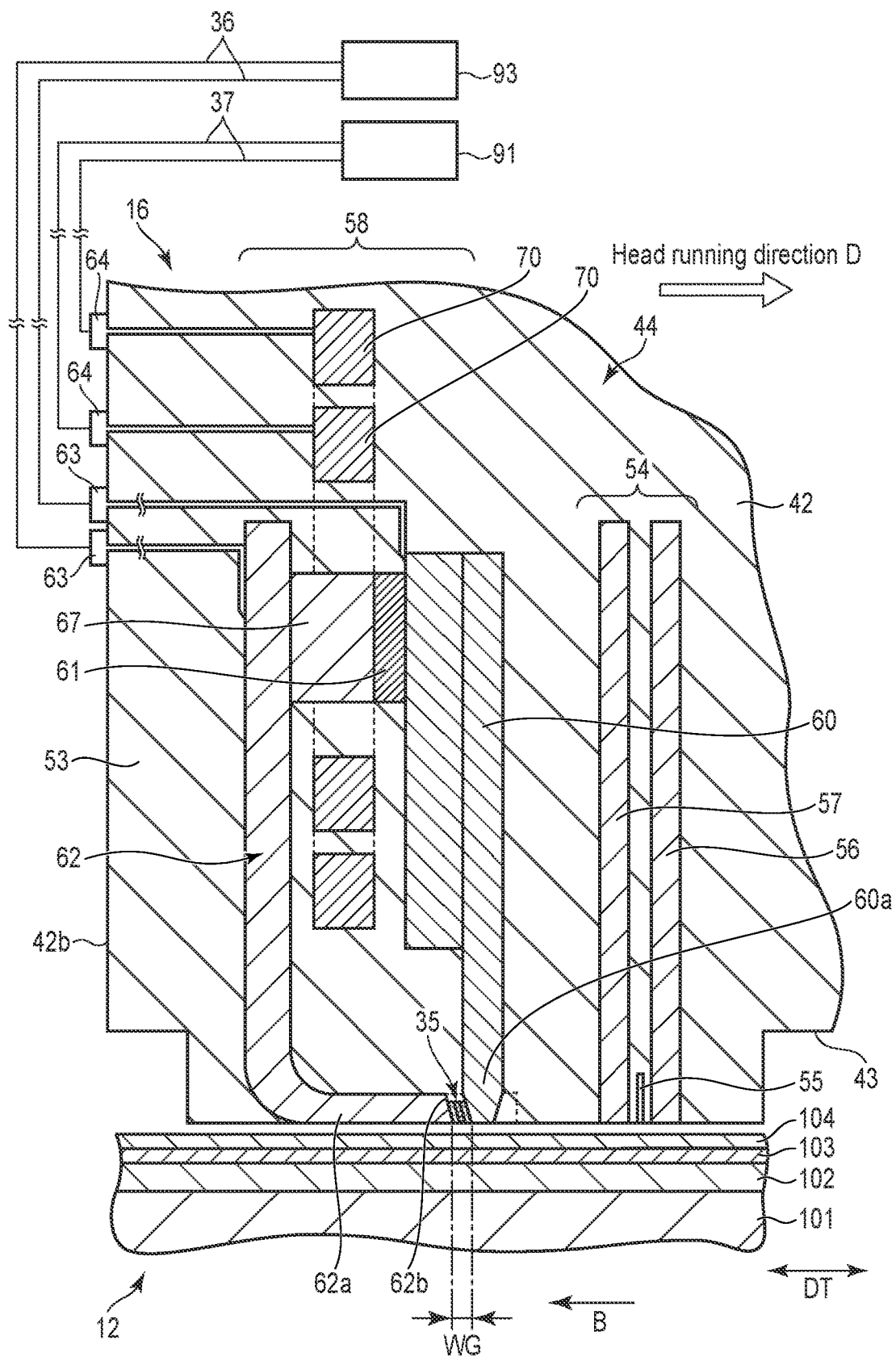
FIG. 3 is an enlarged sectional view showing a head portion of the magnetic head.

FIG. 3 is an expanded sectional view showing the head unit 44. The head unit 44 comprises a reproducing head (read head) 54 and a recording head 58 formed in a thin film process, at the trailing end 42b of the slider 42, and is formed as a separation type magnetic head. The read head 54 and the recording head 58 are covered with a nonmagnetic protective insulating film 53 except parts exposed to the ABS 43 of the slider 42. The protective insulating film 53 forms the outer shape of the head unit 44.

The read head 54 includes a magnetoresistive element 55, and a first magnetic shielding film 56 and a second magnetic shielding film 57 arranged to sandwich the magnetoresistive element 55 on the reading side (flow-in side) and the trailing side (flow-out side) of the magnetoresistive element 55, in the down-truck direction DT (longitudinal direction of the trucks formed on the magnetic disk or the running direction of the head). The magnetoresistive element 55, and the first and second magnetic shield films 56 and 57 extend substantially perpendicularly to the ABS 43. Lower ends of the magnetoresistive element 55, and the first and second magnetic shield films 56 and 57 are exposed to the ABS 43.

Figure 4:
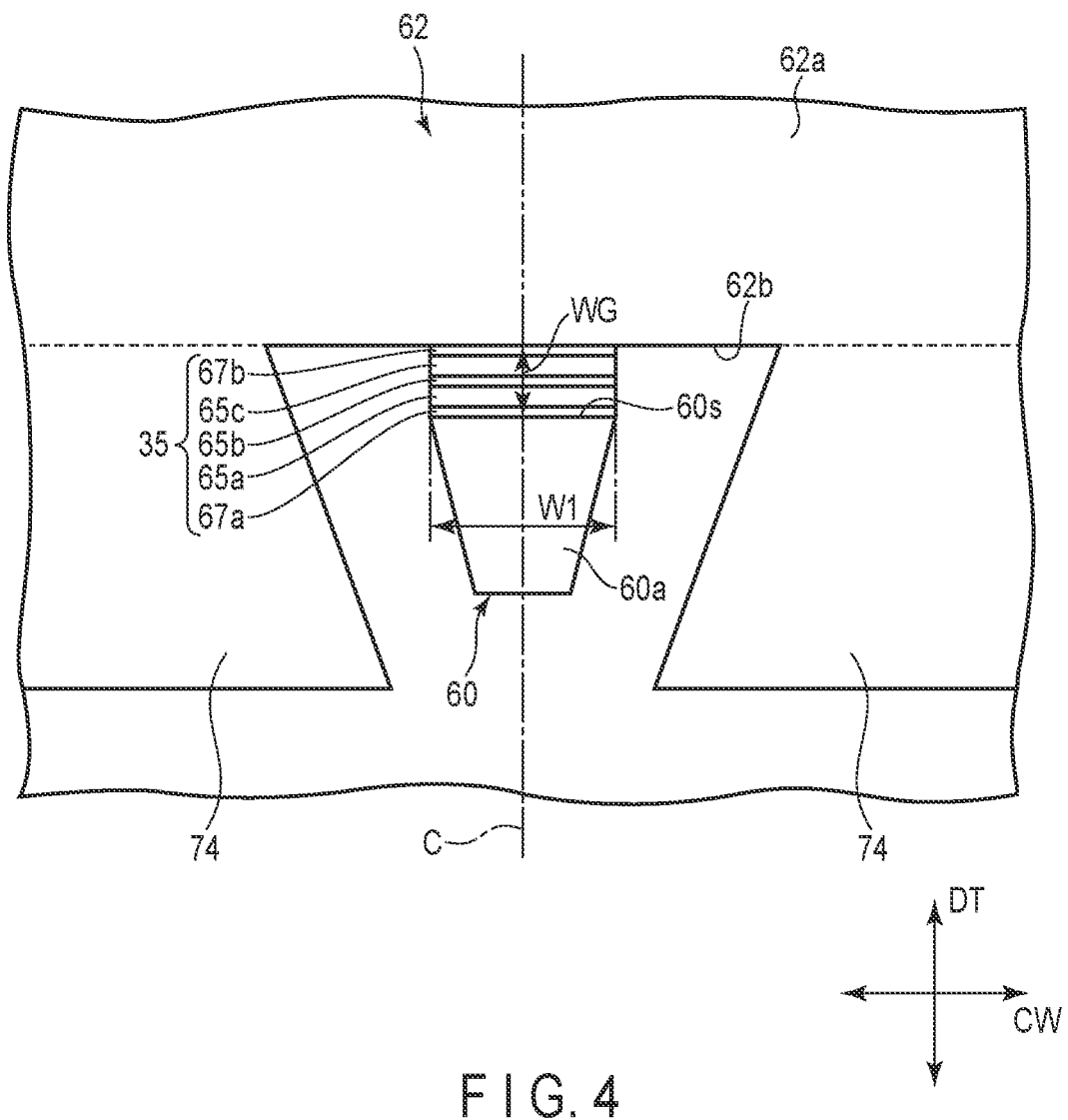
FIG. 4 is a plan view showing the recording head of the magnetic head as viewed from an ABS side.

The recording head 58 is provided on the side of the trailing end 42b of the slider 42, for the reading head 54. FIG. 4 is a plan view showing the recording head 58 viewed from the ABS 43 side. As shown in FIG. 3 and FIG. 4, the recording head 58 comprises a main magnetic pole 60 that generates a record magnetic field perpendicular to the ABS 43 (i.e., to the perpendicular magnetic recording layer 103), a write shield magnetic pole (trailing shield) 62 opposed to the main magnetic pole 60 through a write gap WG, a joint portion 67 that physically joins an upper part of the main magnetic pole 60 to the write shield magnetic pole 62, a record coil 70 wound around a magnetic core composed of the main magnetic pole 60 and the write shield magnetic pole 62, and a high frequency oscillator, for example, spin torque oscillator (STO) 35 provided to face the ABS 43 at a position between a distal end part 60a of the main magnetic pole 60 and the write shield magnetic pole 62.

The main magnetic pole 60 is formed of a soft magnetic material having a high magnetic permeability and a high saturation magnetic flux density, and extends substantially perpendicularly to ABS 43. The distal end part 60a on the ABS 43 side of the main magnetic pole 60 is tapered toward the ABS 43 and the surface of the magnetic disk 12 and is formed in a columnar shape having a small width to the other parts. The distal end surface of the main magnetic pole 60 is exposed to the ABS 43 of the slider 42. The width (width along the truck width direction CW) W1 of the distal end part 60a is formed to be larger than the width of the record track on the magnetic disk 12.

The write shield magnetic pole 62 is formed of a soft magnetic material and is provided to effectively close a magnetic path through the soft magnetic layer 102 of the magnetic disk 12 just under the main magnetic pole 60. The main magnetic pole 60 and the write shield magnetic pole 62 are arranged on a longitudinal axis (central axis C) of the slider 42 and along a down-track direction DT.

The write shield magnetic pole 62 is formed in a substantially L-letter shape, and a distal end part 62a thereof is formed in an elongated rectangular shape. The distal end surface of the write shield magnetic pole 62 is exposed to the ABS 43 of the slider 42. The distal end part 62a has a leading side end surface (magnetic pole end surface) 62b opposed to the distal end part 60a of the main magnetic pole 60. The leading side end surface 62b is much longer than the width W1 of the distal end part 60a of the main magnetic pole 60 and a track width of the magnetic disk 12, and extends along the width direction CW of the track of the magnetic disk 12. The leading side end surface 62b slightly inclines and extends to the ABS 43. On the ABS 43, a lower edge of the leading side end surface 62b is opposed parallel to a trailing side end surface 60S of the main magnetic pole 60 through a write gap WG (gap length of the down track direction DT).

In the present embodiment, the recording head 58 includes a pair of side shields 74. The side shields 74 are physically separated from the main magnetic pole 60, on both sides of the track width direction CW of the main magnetic pole 60, and are arranged to be connected to the write shield magnetic pole 62. In the present embodiment, the side shields 74 are formed of a high permeability material, integrally with the distal end part 62a of the write shield magnetic pole 62, and protrude from the leading side end surface 62b of the distal end part 62a toward the side of the reading end 42a of the slider 42.

As shown in FIG. 3, for example, the record coil 70 is wound around the joint portion 67 between the main magnetic pole 60 and the write shield magnetic pole 62. The record coil 70 is electrically connected to conductive terminals 64 via lines. For example, the conductive terminals 64 are provided on a trailing edge 42b of the slider 42. The conductive terminals 64 are electrically connected to a record current supply circuit 91 via lines 37 of the wiring member 28. When a signal is written to the magnetic disk 12, a record current is supplied from the record current supply circuit 91 to the record coil 70 to flow a magnetic flux to the main magnetic pole 60 and generate a magnetic field. As discussed below, the record current supplied from the record current supply circuit 91 to the record coil 70 is controlled by the main controller 90 of the HDD 10.

An electrically insulating layer 61 is arranged between the write shield magnetic pole 62 and the joint portion 67 such that the main magnetic pole 60 and the write shield magnetic pole are electrically insulated from each other. Each of the main magnetic pole 60 and the write shield magnetic pole 62 is electrically connected to an energizing terminal 63 via a line. For example, the energizing terminals 63 are provided on the trailing edge 42b of the slider 42. The energizing terminals 63 are electrically connected to the STO current supply circuit 93 via lines 36 of the wiring member 28. A current circuit to serially flow a current from the STO current supply circuit 93 through the main magnetic pole 60, the spin torque oscillator 35, and the write shield magnetic pole 62 is thereby configured. The write shield magnetic pole 62 and the main magnetic pole 60 also function as electrodes perpendicularly flowing a current to the spin torque oscillator 35.

Incidentally, the STO current supply circuit 93 flows a predetermined drive current to the spin torque oscillator 35 in a predetermined direction, under the control of the main controller 90.

Next, the spin torque oscillator (STO) 35 will be described in detail. As shown in FIG. 4, the STO 35 is provided between the distal part 60a of the main magnetic pole 60 and the write shield magnetic pole 62 in the write gap WG and is partially exposed to the ABS 43. The STO 35 has a layered structure in which a magnetic member and a nonmagnetic member are stacked. For example, the STO 35 includes a spin injection layer 65a formed of a magnetic metal, an intermediate layer (nonmagnetic conductive layer) 65b, and an oscillating layer 65c, and is configured by sequentially stacking these layers from the main magnetic pole 60 side to the write shield magnetic pole 62 side, i.e., sequentially along the running direction D of the magnetic head. The spin injection layer 65a is joined to the trailing side end surface 60S of the main magnetic pole 60 via a nonmagnetic conductive layer (underlayer) 67a. The oscillating layer 65c is joined to the leading side end surface 62b of the write shield magnetic pole 62 via a nonmagnetic conductive layer (cap layer) 67b. Incidentally, the stacking order of the spin injection layer 65a, the intermediate layer 65b, and the oscillating layer 65c may be opposite to that described above, i.e., the layers may be sequentially stacked from the write shield magnetic pole 62 side to the main magnetic pole 60 side.

Each of the spin injection layer 65a, the intermediate layer 65b, the oscillating layer 65c has a stacking surface or a film surface spreading to a direction intersecting the ABS 43. A lower end surface of the STO 35 is exposed to the ABS 43 and is formed to be flush with the ABS 43. The width of STO 35 of the track width direction CW is set to be approximately equal to the track width or approximately equal to the width W1 of the main magnetic pole 60. The height of the STO 35 (height of the direction perpendicular to the ABS 43) is formed to be approximately equal or lower than the height of the leading side end surface 62b of the write shield magnetic pole 62.

According to the HDD 10 comprising the magnetic head 16 configured as described above, the record current supply circuit 91 of the head amplifier IC 30 flows the record current to the record coil 70 in accordance with the record signal and the record pattern generated from the R/W channel 94, at the recording. Thus, the record coil 70 energizes the main magnetic pole 60 and generates a record magnetic field from the main magnetic pole 60.

The STO current supply circuit 93 serially flows a predetermined drive current through the line 36, the energizing terminal 63, the main magnetic pole 60, the STO 35, and the write shield magnetic pole 62, by applying a voltage to the main magnetic pole 60 and the write shield magnetic pole 62, under the control of the MPU 46.

By balancing the spin transfer torque force generated by energizing the STO 35 and the gap field between the main magnetic pole 60 and the write shield magnetic pole 62, magnetization of the STO 35 rotates in a natural oscillation cycle and the STO 35 oscillates a high frequency magnetic field. The high frequency magnetic field is applied to the magnetic disk 12 to oscillate the magnetization of the perpendicular magnetic recording layer 103, the record magnetic field is applied from the main magnetic pole 60 to the perpendicular magnetic recording layer 103, and the record signal is thereby written to the magnetic recording layer 103.

On the HDD 10, tolerance of the shape of the distal part of the main magnetic pole may occur in the manufacturing process of the magnetic head 16. Since the tolerance also affects the size of the gap field, an oscillation initiation record current of the STO 35 may differ by the magnetic head. Thus, on the HDD 10 according to the present embodiment, the current value of the record current whose oscillation is initiated by the STO 35 is detected for each magnetic head, and the current value of the record current supplied to the magnetic head is set to be higher than or equal to the detected oscillation initiation record current value.

Figure 5:
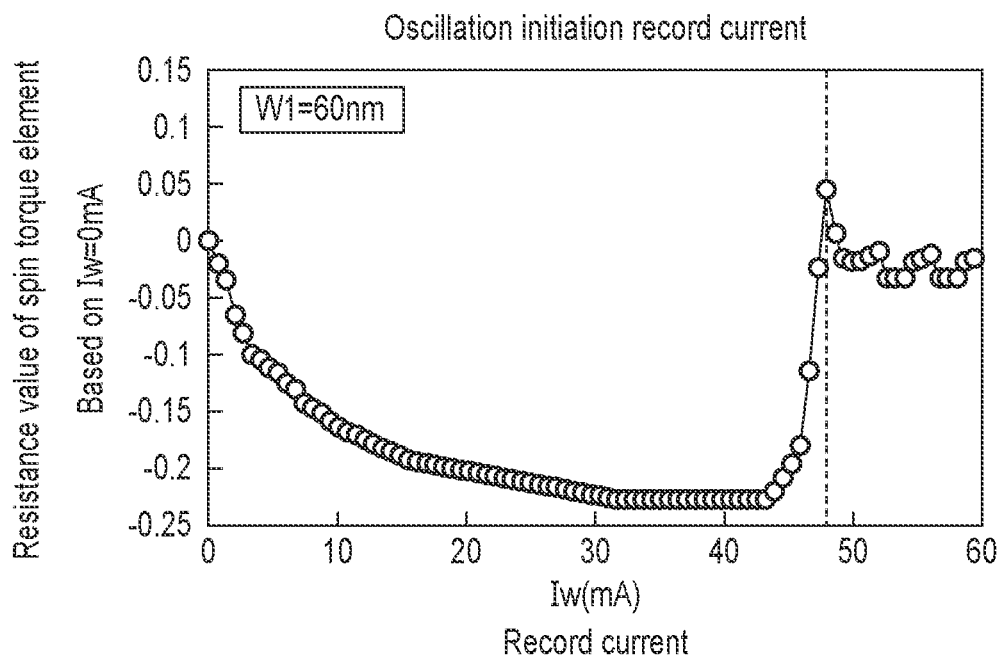
FIG. 5 is a graph showing a relationship between a resistance value of the spin torque oscillator and a record current in a state of energizing the spin torque oscillator, at the magnetic head in which a width W1 of the main magnetic pole is 60 nm.
Figure 6:
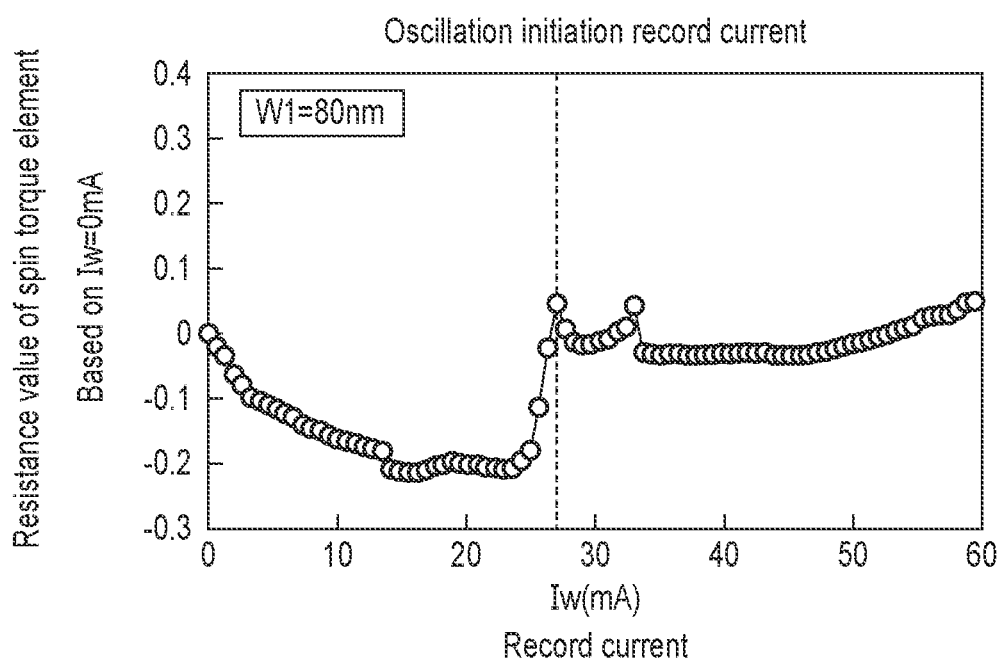
FIG. 6 is a graph showing a relationship between a resistance value of the spin torque oscillator and a record current in a state of energizing the spin torque oscillator, at the magnetic head in which a width W1 of the main magnetic pole is 80 nm.

FIG. 5 is a graph showing a relationship between the record current and a resistance value of the STO 35 in a state in which the STO 35 is energized, on the magnetic head having the width W1 of the main magnetic pole of 60 nm. FIG. 6 is a graph showing a relationship between the record current and a resistance value of the STO 35 in a state in which the STO 35 is energized, on the magnetic head having the width W1 of the main magnetic pole of 80 nm. In FIG. 5 and FIG. 6, the resistance value of the STO is represented based on the resistance value in a case where the record current Iw is 0 mA.

As shown in the graphs, the resistance value of the STO is varied depending on the record current supplied to the record coil, and the variation in resistance value reflects an oscillation condition of the STO. When the record current flowing to the record coil is increased, the gap magnetic field also increases, the gap magnetic field and the spin-polarized spin transfer torque torque are balanced with a certain record current, and have oscillator of the STO. At this time, the resistance value of the STO 35 greatly increases. That is, the great increase in the resistance value of the STO 35 indicates that the oscillation of the STO 35 has occurred. The current value of the record current at this time is referred to as the oscillation initiation record current of the STO.

As shown in FIG. 5, the record current=48 mA corresponds to the oscillation initiation record current, at the magnetic head having the width W1 of the main magnetic pole of 60 nm. As shown in FIG. 6, the record current=27 mA corresponds to the oscillation initiation record current, at the magnetic head having the width W1 of the main magnetic pole of 80 nm.

Figure 7:
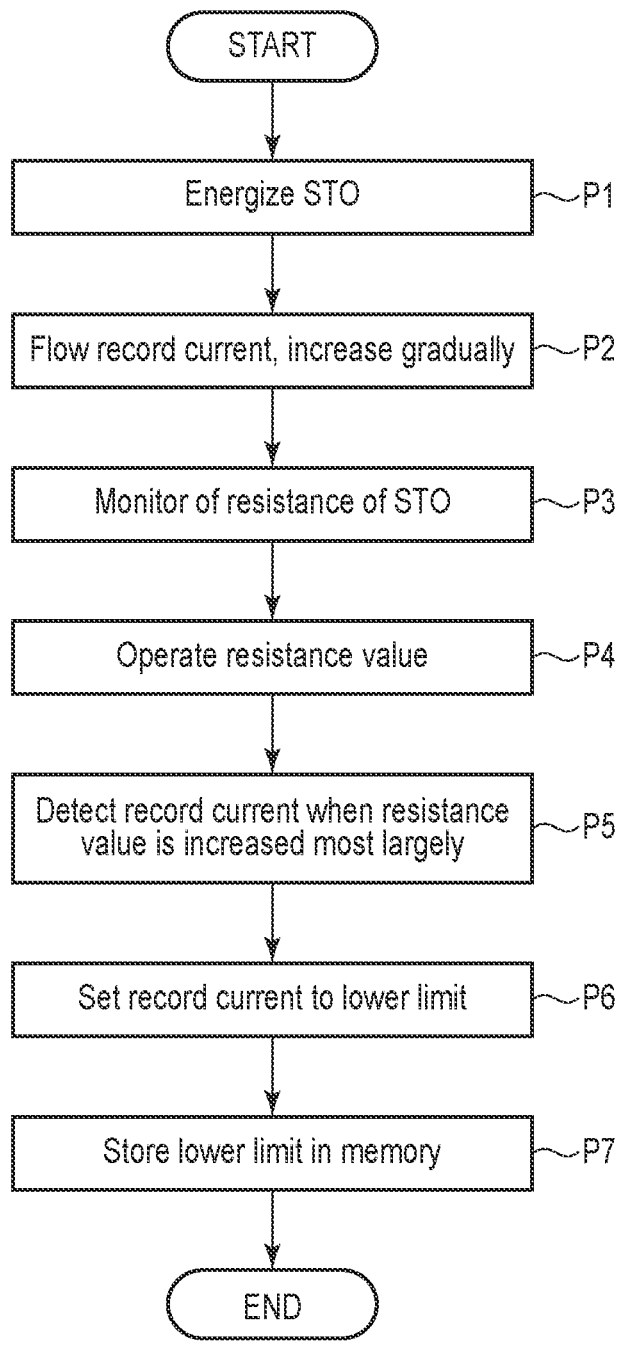
FIG. 7 is a flowchart showing a process operation of the controller.

FIG. 7 is a flowchart showing the process operation of the controller.

For example, in the HDD 10 according to the present embodiment, the main controller 90 operates and detects the oscillation initiation record current value for each magnetic heads 16 and sets the detected oscillation initiation record current value as a lower limit of the record current just before shipment of the HDD. More specifically, as shown in FIG. 7, in a state of flowing a predetermined drive current to the STO 35 (P1), the main controller 90 flows the record current and gradually increases the record current (P2). During this period, the MPU 97 monitors the variation in the resistance value of the STO 35 (P3) and detects the record current value (oscillation initiation record current value) at the time when the resistance value increases most greatly by operations (P4 and P5). The MPU 97 sets the detected record current value to a lower limit of the record current of the magnetic head 16 (P6) and stores the lower limit in the memory 80 (P7). In the operation of the HDD 10, the main controller 90 sets the record current to be the lower limit or more (i.e., the oscillation initiation record current value or more) and executes the record operation, for each magnetic head 16. Thus, the STO 35 can stably execute oscillation and generate a high frequency magnetic field enough to execute the magnetization inversion of the magnetic recording layer of the magnetic disk 12. As a result, increase in recording density can be implemented by the recording head and, simultaneously, the improvement of the record quality can be attempted.

FIG. 8 shows example 1 in which different oscillation initiation record current values (lower limits) are set for respective track widths W1 of the main magnetic pole and comparative example 1 in which the record current value is uniformly set to 30 mA. In the graph, the record current value is plotted for each track width W1 of the main magnetic pole.

In the present embodiment, the main controller 90 may set the lower limit of the record current of each magnetic head 16 in accordance with the track width W1 of the main magnetic pole, as described in example 1. As the track width W1 of the main magnetic pole 60 becomes larger, the oscillation initiation record current value is lower. This is because the gap magnetic field in the same record current is larger as the track width W1 of the main magnetic pole 60 is larger.

FIG. 9 shows a relationship between the track width W1 of the main magnetic pole and the bit error rate in a state in which the STO 35 is energized, on the magnetic head of example 1 and the magnetic head of comparative example 1 at which the record current values are set as shown in FIG. 8.

In comparative example 1, the low record current value is set for the oscillation initiation record current, particularly, on the magnetic heads having the track width of the main magnetic pole of 50 nm and 60 nm. For this reason, the oscillation of the STO is insufficient and the record signal quality is degraded, i.e., the bit error rate is increased.

In contrast, in example 1, different oscillation initiation record current values are set for the respective track widths W1, on the magnetic heads having the different track widths W1. For this reason, the magnetic head having any track width W1 generates a sufficient high frequency magnetic field. As a result, the bit error rate is lowered and the record signal quality is improved. It can be understood that in comparison with comparative example 1, the bit error rate is greatly improved on the side on which the track width W1 of the main magnetic pole is narrow, on the magnetic head of example 1.

Based on the above, according to the present embodiment, the magnetic disk device capable of oscillating a sufficient high frequency magnetic field without being affected by the manufacturing tolerance, and attempting improvement of the record density and improvement of the record quality can be obtained.

Figure 10:
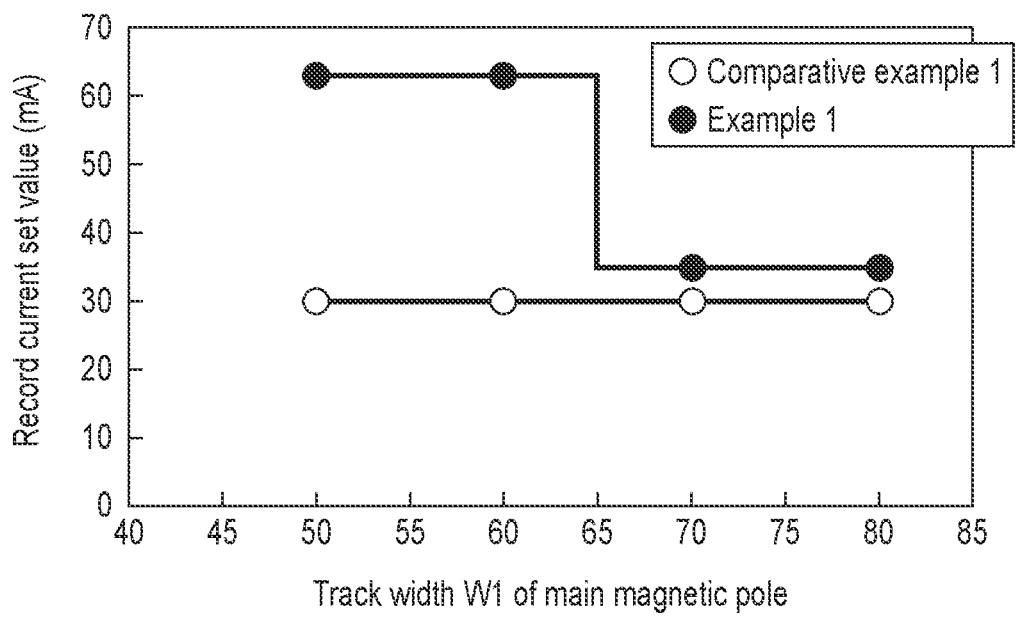
FIG. 10 is a graph showing a modified example of the first embodiment in which the record current value is varied in stages.

Incidentally, as shown in FIG. 8, the record current value is set to be varied continuously depending the track width W1 of the main magnetic pole, in the present embodiment, but the record current value is not limited to this and may be set to be varied progressively for each predetermined range of the track width as shown in FIG. 10.

Next, the HDD and the magnetic head according to the other embodiments will be described. Incidentally, in the other embodiments described below, the same portions as those of the first embodiment may be denoted by the same reference numerals as those of the first embodiment and their detailed descriptions may be omitted or simplified.

Second Embodiment

HDD according to the second embodiment will be described.

Figure 11:
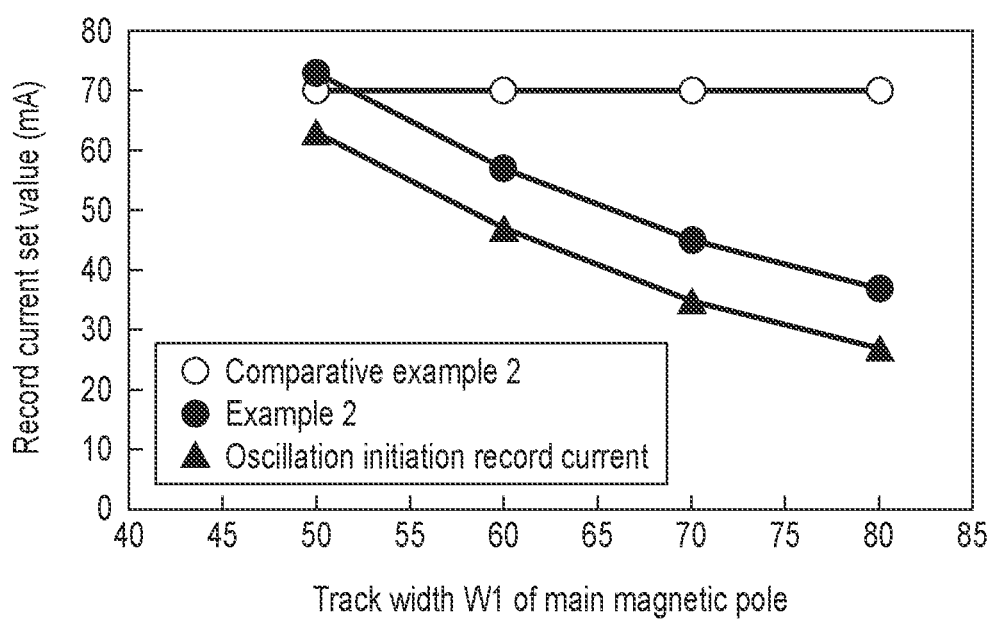
FIG. 11 is a graph showing a relationship between the record current set value and the track width of the main magnetic pole, at the magnetic head of the HDD according to the second embodiment.

FIG. 11 shows plots of a record current set value (example 2), a record current set value (comparative example 2) of the HDD according to comparative example 2, and an oscillation initiation record current value, on the HDD according to the second embodiment, for each track width W1 of the main magnetic pole 60.

In comparative example 2, the record current is set to 70 mA uniformly for all track widths W1. In contrast, in example 2, the record current is set to a different current value depending on the track width W1 of the main magnetic pole 60. The set current value is the oscillation initiation record current value or more in both comparative example 2 and example 2 but, in example 2, the record current value is set to be smaller as the track width W1 of the main magnetic pole 60 becomes wider. That is, in the second embodiment, the main controller 90 of the HDD 10 sets the oscillation initiation record current value to the lower limit of the record current and sets the current value of example 2 to the upper limit of the record current. For example, the upper limit is set to be approximately the oscillation initiation record current value (lower limit) +10 mA. The set lower limit and the set upper limit are stored in the memory 80. In the operation of the HDD, the main controller 90 sets the record current value based on the upper limit and the lower limit stored in the memory 80 for each magnetic head and supplies the record current of the set current value to the record coil 70 of the magnetic head 16.

FIG. 12 shows a relationship between the track width W1 and the bit error rate of the main magnetic pole 60 in the state in which the STO 35 is energized in the above-described example 2 and comparative example 2.

As shown in the graph, the bit error rate of example 2 is greatly improved on the side where the track width W1 is large, of the main magnetic pole 60, in comparison with the bit error rate of comparative example 2.

The high frequency magnetic field generated from the STO 35 oscillates the magnetization of the magnetic recording layer 103 and facilitates writing to the recording head 58, and writing can be executed most easily when the resonance frequency of the magnetic recording layer 103 matches the frequency of the high frequency magnetic field. Since the frequency of the high frequency magnetic field is proportional to the gap magnetic field, the frequency of the high frequency magnetic field becomes high and frequency drift occurs between the frequency and the ferromagnetic resonance frequency of the magnetic recording layer 103 when the gap magnetic field becomes large.

In comparative example 2, particularly, on the magnetic head having the track width of the main magnetic pole of 70 nm and 80 nm, the oscillation of the STO occurs since the record current value is set be higher than the oscillation initiation record current and, in contrast, the gap magnetic field becomes large, the frequency becomes higher than the resonance frequency of the magnetic recording layer, the bit error rate is increased, and the signal quality is thereby deteriorated.

In example 2, the record current value is the oscillation initiation record current value or more, but the oscillation frequency of the STO 35 is suppressed to the frequency near the resonance frequency of the magnetic recording layer by setting the upper limit depending on the track width of the main magnetic pole 60. Thus, the high frequency magnetic field of the optimum frequency can be applied to the magnetic recording layer, and the reduction in the bit error rate, i.e., improvement of the record signal quality can be attempted.

As described above, according to the second embodiment, the magnetic disk device capable of oscillating the high frequency magnetic field of the optimum frequency, and attempting the improvement of the record density and the improvement of the record signal quality by setting the lower limit and the upper limit of the record current can be obtained.

Incidentally, as shown in FIG. 11, the upper limit of the record current value is set to be varied continuously depending the track width W1 of the main magnetic pole, in the present embodiment, but the upper limit is not limited to this and may be set to be varied progressively for each predetermined range of the track width as shown in FIG. 13.

Third Embodiment

HDD according to the third embodiment will be described.

Figure 14:
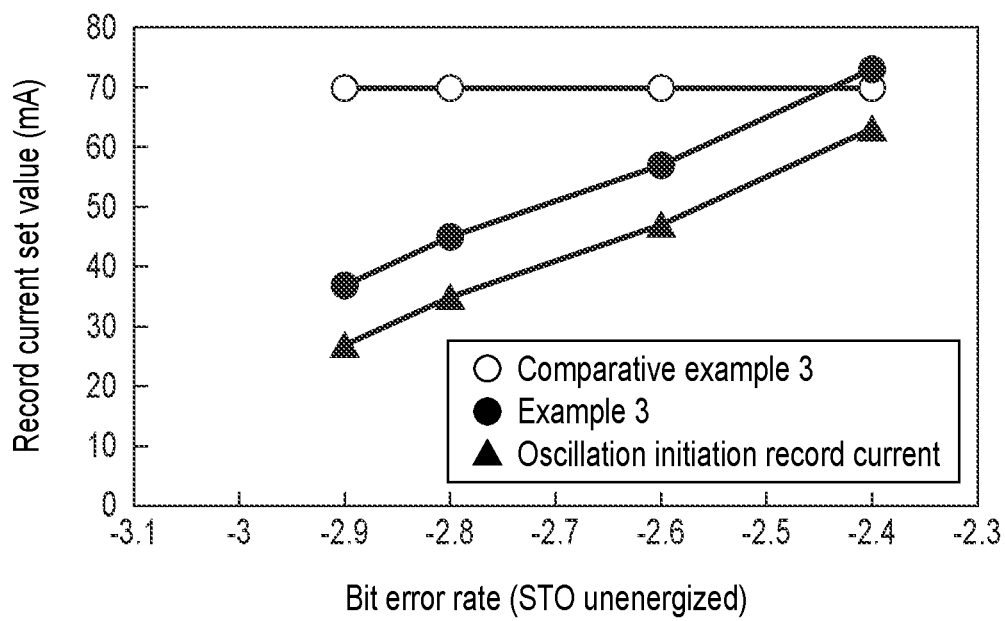
FIG. 14 is a graph showing a relationship between the record current set value and the bit error rate, at the magnetic head of the HDD according to the third embodiment.

FIG. 14 shows plots of a record current set value (example 3), a record current set value (comparative example 3) of the HDD according to comparative example 2, and an oscillation initiation record current value, on the HDD according to the third embodiment, for each bit error rate.

The upper limit of the record current is set depending on the track width W1 of the main magnetic pole in the above-described second embodiment but, according to the third embodiment, a main controller 90 of HDD 10 sets an upper limit (example 3) of the record current depending on a measured bit error rate in a state (STO non-conductive) in which STO 35 is not energized and a state in which the record current is set uniformly to 40 mA. This is because the gap magnetic field is larger as the bit error rate is more desirable, on the head, under the above-described conditions. For example, the upper limit is set to be approximately the oscillation initiation record current value (lower limit) +10 mA. The set lower limit and the set upper limit are stored in the memory 80. In the operation of the HDD 10, the main controller 90 sets the record current value based on the upper limit and the lower limit stored in the memory 80 for each magnetic head and supplies the record current of the set current value to the record coil 70 of the magnetic head 16.

As shown in FIG. 14, the record current is set uniformly to 70 mA for all bit error rates in comparative example 3. In contrast, according to the present embodiment, the lower limit (oscillation initiation record current) and the upper limit (example 3) of the record current are set to different current values depending on the bit error rate.

As described above, the oscillatory frequency of the STO 35 is suppressed to the frequency near the resonance frequency of the magnetic recording layer by setting the upper limit of the record current depending on the bit error rate. Thus, the high frequency magnetic field of the optimum frequency can be applied to the magnetic recording layer, and the reduction in the bit error rate, i.e., improvement of the record signal quality can be attempted.

Fourth Embodiment

HDD according to the fourth embodiment will be described.

Figure 15:
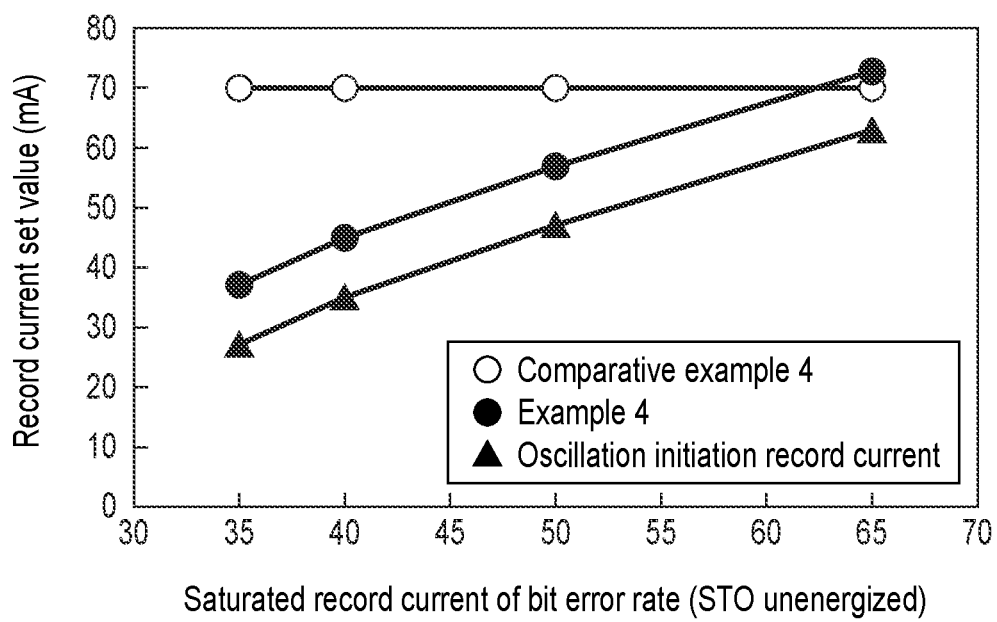
FIG. 15 is a graph showing a relationship between the record current set value and a saturation record current of the bit error rate, in the third embodiment.

FIG. 15 shows plots of a record current set value (example 4), a record current set value (comparative example 4) of the HDD according to comparative example 4, and an oscillation initiation record current value, on the HDD according to the fourth embodiment, for each saturated record current of the bit error rate. As an example of the saturated record current, the record current at which the variation amount of the bit error rate is smaller than a certain threshold value when the record current is increased is referred to as the saturated record current.

According to the fourth embodiment, the main controller 90 of the HDD 10 sets the upper limit (example 4) of the record current depending on the record current value at which the measured bit error rate value is saturated, in a state (STO non-conductive) in which the STO 35 is not energized and a state in which the record current is set uniformly when gradually increased. This is because the gap magnetic field is larger as the saturated record current value is lower, on the head. For example, the upper limit is set to be approximately the oscillation initiation record current value (lower limit) +10 mA. The set lower limit and the set upper limit are stored in the memory 80. In the operation of the HDD, the main controller 90 sets the record current value based on the upper limit and the lower limit stored in the memory 80 for each magnetic head and supplies the record current of the set current value to the record coil 70 of the magnetic head 16.

As shown in FIG. 15, the record current is set uniformly for all saturated record currents in comparative example 4. In contrast, according to the present embodiment, the lower limit (oscillation initiation record current) and the upper limit (example 4) of the record current are set to different current values depending on the saturated record current value of the bit error rate.

As described above, the oscillation frequency of the STO 35 is suppressed to the frequency near the resonance frequency of the magnetic recording layer by setting the upper limit of the record current depending on the saturated record current value of the bit error rate in the state in which the STO is not energized. Thus, the high frequency magnetic field of the optimum frequency can be applied to the magnetic recording layer, and the improvement of the record signal quality can be attempted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shape, dimensions, and configuration of the spin torque oscillator are not limited to the embodiments but can be changed as needed. The material, shape, size, and the like of the elements to configure the head unit of the magnetic head can be changed as needed. In the magnetic disk device, the number of the magnetic disks and magnetic heads can be increased as needed, and the size of the magnetic disk can also be selected variously.

What is claimed is:

1. A magnetic disk device comprising:
a disk-shaped recording medium including a magnetic recording layer;
a recording head comprising a main magnetic pole generating a recording magnetic field to the magnetic recording layer, a write shield magnetic pole opposed to the main magnetic pole with a write gap to configure a magnetic core together with the main magnetic pole, a coil exciting a magnetic flux at the magnetic core, and a spin torque oscillator provided between the main magnetic pole and the write shield magnetic pole inside the write gap; and
a controller comprising a record current supply circuit applying a record current to the coil and a drive current supply circuit supplying a drive current to the spin torque oscillator, the controller being configured to execute a process of monitoring variation of a resistance value of the spin torque oscillator while increasing the record current in a state in which the spin torque oscillator is energized, and executing and detecting a record current value when the resistance value is increased most largely so that an oscillation of the spin torque oscillator has occurred, and a process of setting the detected record current value to act as a lower limit of the record current supplied to the coil.

2. The magnetic disk device of claim 1, wherein the controller sets an upper limit of the record current to a lower value as the width of the main magnetic pole is larger.

3. The magnetic disk device of claim 1, wherein the controller sets an upper limit of the record current to be varied progressively with a predetermined range of the track width depending on a variation of the width of the main magnetic pole.

4. The magnetic disk device of claim 1, wherein the controller sets an upper limit of the record current to a lower value as a bit error rate of the recording head in a state in which the spin torque oscillator is unenergized is lower.

5. The magnetic disk device of claim 4, wherein the controller progressively varies the upper limit of the record current with a predetermined range of the bit error rate.

6. The magnetic disk device of claim 1, wherein the controller sets an upper limit of the record current to a lower value as a saturated record current value of a bit error rate of the recording head in a state in which the spin torque oscillator is unenergized is lower.

7. The magnetic disk device of claim 6, wherein the controller sets the upper limit of the record current to be varied progressively with a predetermined range of a saturated record current value of the bit error rate.

* * * * *